April 6, 1965 E. J. J. BENARD 3,177,059
METHOD FOR BURNING OFF THE MOIL OF A GLASS ROTARY
BODY AND APPARATUS FOR THE
APPLICATION OF THE METHOD
Filed Sept. 12, 1961
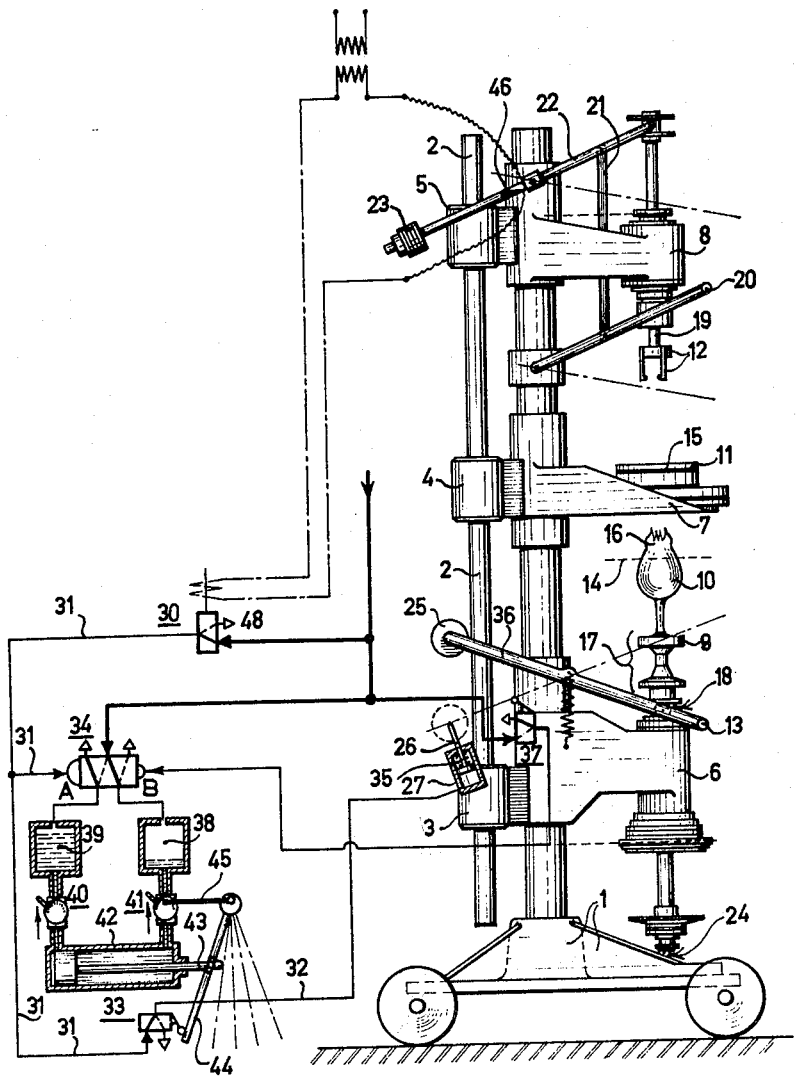
INVENTOR.
Emil J J Benard
BY
ATTORNEY

United States Patent Office 3,177,059
Patented Apr. 6, 1965

3,177,059
METHOD FOR BURNING OFF THE MOIL OF A GLASS ROTARY BODY AND APPARATUS FOR THE APPLICATION OF THE METHOD
Emil Jan Johan Benard, Leerdam, Netherlands, assignor to N.V. Vereenigde Glasfabrieken (United Glassworks), Schiedam County, Netherlands, a limited-liability company of the Netherlands
Filed Sept. 12, 1961, Ser. No. 137,632
9 Claims. (Cl. 65—105)

The invention relates to improvements in the method for burning off a moil or ring of a rotary glass body which is vertically positioned on a base and wherein the cutting is effected in a flame corona, arranged along the circumference of the object at the location of the plane of severance, while the moil is seized by a clutch which carries off the same after severance, for example, as disclosed in U.S. Letters Patent No. 1,577,538 to Parker.

It is an object of the present invention to make possible the mechanical manufacture of high quality glass ware, such as goblets, chalices and lead crystal ware, which measures up to a standard of quality previously achievable only by highly skilled handwork.

It is a further object of the invention to provide a method and apparatus which compensates for variations in the thickness or other characteristics of the glass body from which the moil is to be removed, so as to effect such removal and the finishing of the resulting edge with a high degree of precision.

It is a feature of the present invention that it makes possible the high speed production of inexpensive glass ware with a more attractive finish on semi automatic or automatic machinery.

It appears that there is a certain ratio between the time required for burning in or finishing the edge necessary for burning off or softening and severing the moil, the latter varying according to minor differences in the wall thickness of the articles which are unavoidable. If for instance the wall is thicker the time for severing the moil will be slightly longer with a given tensile force being applied thereto. This influences the time elapsing between the beginning of the burn off process and the moment at which the clutch gripping the moil can freely move and carry the moil away from the remainder of the glass article.

In accordance with this invention, the time during which the edge of the glass article is exposed to the flame corona for the burning-in or finishing thereof is controlled as a function of the time previously required for the severing of the moil from the glass article.

The drawing is a side elevation in which a so-called burning off apparatus suitable for the application of the method according to the invention is diagrammatically represented.

As shown in the drawing, a base 1 supports a guide column 2 along which guide sleeves 3, 4, 5 are adjustably arranged one above the other. Sleeve 3 supports a carrier 6 for the base 9, on which the article 10 to be operated upon is positioned, sleeve 4 supports a tool carrier 7 for an annular burner 11 and sleeve 5 supports a tool carrier 8 for a clutch 12.

In the drawing the two main tool carriers 6 and 8 are shown in their lowermost and uppermost positions, respectively, so as to expose the parts associated therewith.

During operation, the carriers 6, 7 and 8 are positioned relative to each other so that, by raising the lever 13, the base 9 can be brought to a level at which the line of severance 14 of the article 10 is exactly situated in the cutting plane 15 of the annular burner 11 and so that the clutch or chuck 12 can engage the waste piece or moil 16 when the clutch supporting shaft 19 is lowered by means of the handle arm 20. This arm 20 is connected by way of the rod 21 to the lever arm 22 which, at its end, is coupled with the upper end of the shaft 19.

The base 9 can be a part of a so called oscillating element 17 which functions to center the glass body 10 at the plane of severance 14 coaxially with the center line of the annular burner 11. The base 9 is then fixed in the centered position with respect to the shaft 18. Vacuum means can be employed for retaining the foot of the glass article 10 on the base plate 9 and for fixing the latter to a holder on the shaft 18 after centering adjustment of the base plate. A vacuum duct is connected at 24 to the hollow shaft 18 for the foregoing purpose.

In the illustrated embodiment, the shaft 18 and the shaft 19 of the clutch 12 are rotated at the same speed. A pull is exerted in an upward direction on the clutch 12 by means of the weight 23 on the lever arm 22. In the case of a typical chalice, such pull may amount to 50–100 grams.

The manner in which the moil 16 is severed and the rim of the glass body 10 is finished shall now be described.

The glass article 10 is positioned on the base 9 and, by manipulation of the handle 13 is raised towards the burner 11 where the moil 16 will be burnt off. In the correct burn-off position, the plane of severance 14 of the glass article coincides with the plane 15 in the burner. However, before the article reaches the right level in the burner (about 5 cm. short of the correct burn-off position), the counter weight 25 on the arm 36 of the handle 13 contacts the piston rod 26 of air cylinder 27 (see position indicated by dotted lines.)

In this position centering of the glass article 10 can take place as indicated hereinbefore. Now the shaft 19 is moved downwardly by manipulation of the handle 20 and the waste piece or moil 16 is seized by the clutch 12. During this movement a mercury switch 46 connected with the arm 22 closes an electric circuit, indicated by dot-dash lines, for energizing the solenoid of a three way valve 30, whereby the air duct 31 is connected to the atmosphere at a vent port 48. The air can thereby flow from the cylinder 27 by way of a duct 32, a three way valve 33, the duct 31 and the port 48 of valve 30.

By energizing of the solenoid of the valve 30, the pressure on the A-side of the differential-four-way valve 34 is also neutralized or vented to atmosphere (the pressure receiving surface in this valve on the A-side is about two times as large as the surface on the B-side) by way of the duct 31 and the outlet or vent port 48 of the valve 30. As the pressure in the cylinder 27 is neutralized or vented, the piston rod 26 sinks under the influence of the spring 35 in the cylinder. Therefore, the handle 13 can move further until the glass article is at the correct burn-off position, this movement coinciding approximately with the advance of the clutch 12 into engagement with the waste piece 16 of the glass article 10. At the moment when the glass article 10 arrives at the correct position in the burner 11 and the burning off process starts, the lever 36 presses the actuating lever of a three way valve 37 as a result of which the latter permits compressed air to enter the B-side of the valve 34, whereby the valve 34 is shifted. Such shifting of valve 34 commences the sensing or registering of the time required to sever the moil.

In the illustrated embodiment of the invention, the device for sensing the time required to sever the moil 16 from the article 10 includes a cylinder 42 having a piston 43 movable therein and connected, at its opposite ends, to oil containing tanks 38 and 39 by way of adjustable flow control valves 41 and 40, respectively. The tanks 38 and 39 have their upper ends connected to valve 34 so as to be alternately vented to the atmosphere and connected to a source of compressed air through such valve.

When valve 34 is shifted by the admitting of compressed air to the side B thereof, valve 34 vents the top of tank 38 to the atmosphere. At the same time compressed air is admitted through valve 34 above the oil in tank 39, so that oil flows through flow regulator valve 40 to the left-hand end of cylinder 42 which moves the piston 43 to the right. The oil at the right of the piston 43 escapes into the tank 38 through the flow regulator valve 41. The flow regulator or metering valves 40 and 41 permit free flow in the directions of the arrows, and thus only adjustably meter the rate of flow in the directions opposed to the arrows. The speed at which the piston rod 43 moves to the right is thus determined by the adjustment of the valve 40.

A lever 44 is connected with the piston rod of piston 43, and actuates the valve 33 at the beginning of this movement of piston 43 toward the right, whereby the duct 32 and hence the cylinder 27 are now vented to the atmosphere through valve 33, while the duct 31 is closed at the valve 33.

As soon as the glass article 10 is softened at the burn off plane 15 of the coronary burner 11, the clutch 12 together with the moil 16 can start moving upwardly under the influence of the weight 23. The glass article is first stretched and then burnt off at the plane of severance 14. The edge of the glass article, however, remains in the coronary burner and is "burnt-in" in or finished order to obtain the desired shape of the edge. At the beginning of this burn-in period the mercury switch 46 is again opened in response to the upward movement of the clutch 12, whereby the valve 30 is returned to the position represented in the drawing. Compressed air is admitted in the duct 31 and consequently to the A-side of the valve 34 (the valve 33 does not allow the air now to escape from the duct 31 as has been mentioned hereinbefore). The B-side of the valve 34 is also exposed to pressure but, since the area at the A-side is larger than that at B, the valve 34 is nevertheless returned to the position represented in the drawing. Thus, the top of the tank 39 is vented to atmosphere whereas pressure is again admitted to the tank 38. The quantity of oil admitted to the tank 38 during the burn-off period now flows back through valve 41 into cylinder 42. This quantity of oil determines the burn-in time in dependence on the burn-off time, but with an adjustable ratio between the burn-off or severance time and the burn-in or edge finishing time.

The piston 43 moves to the left under the pressure of the oil fed from the cylinder 42 to the tank 38 and so does the lever 44. The velocity of the return movement is now regulated by the valve 41 and, as soon as the lever 44 again contacts the actuating member of valve 33, compressed air from duct 31 can pass through the duct 32 into the cylinder 27, whereby the counterweight 25 is pushed upwardly by the piston rod 26. The resulting swinging of handle 13 causes the glass object 10 to be moved downwardly from the burner over a distance of about 5 cm. which concludes the burning-in process. The swinging of handle 13 also permits return of valve 37 to the represented position and the pressure on the B-side of valve 34 is vented to atmosphere through valve 37. The moil is removed from the clutch 12, while the now finished glass article is taken off base 9.

The time for burning-in or finishing of the edge is advantageously adjusted to one fifth of the burn-off or severance time in the case of thin glass ware. Thus, the valve 41 is adjusted to provide less restriction to the flow therethrough than the valve 40. In the absence of any connection between lever 44 and valve 41, as hereinafter described in detail, the rates of movement of piston 43 in the opposite directions would be uniform and determined by the adjustments of valves 40 and 41 providing an adjustably fixed ratio between the "burn-off" time and the "burn-in" time. A glass article having a thicker wall requires a longer burn-off time (for this time is defined by the glass object itself which must first soften before the clutch 12 moves upwardly thereby returning switch 46 to its open position), and the sensed longer burn-off time would then also automatically involve a proportionally longer burn-in time. It has been noted, however, that, when a glass object has a wall which is thicker than normal, the ratio of the burn-in or finishing time to the burn-off or severance time should be reduced in order to obtain a finished edge of high quality.

This adjustment of the ratio of the finishing time to the severance time is effected by means of the connecting rod 45 which is connected, at one end, to the lever 44 at a location above the swinging axis of the latter so that the rod 45 moves further to the left as the lower end of lever 44 is moved further to the right. The other end of the rod 45 is pivotally connected with the actuating disc of valve 41, so that movement of the rod 45 to the left causes further opening of the valve 41. The connection of rod 45 to valve 41 does not influence the flow of the liquid on movement of the piston 43 to the right, as this movement is regulated by the adjustable valve 40. However, during the return movement, when the rod 45 moves to the right and progressively closes the valve 41, the burn-in or finishing time is varied by the extent to which the valve 41 has been opened at the conclusion of the burn-off time.

In the event of a short burn-off time, the lever 44 has only a short stroke, and therefore causes only slight further opening of valve 41. In the event of a longer burn-off time, the lever 44 has a long stroke and the valve 41 is moved to a wide opened position, so that the return movement is relatively rapid for a substantial initial portion of the period, thereby to shorten the finishing time.

Thus, in accordance with this invention, the finishing time is made a function of the severance time, and the ratio of the finishing time to the severance time is made to decrease with increases in the severance time.

What I claim is:
1. An apparatus for severing a moil from a body portion of a glass article and for finishing the edge of the body portion comprising
an annular burner for emitting a flame corona,
support means for the glass article movable coaxially toward and away from the burner so as to move the glass article to and from a treating position where the plane of severance between its moil and body portion coincides with the plane of said flame corona,
clutch means movable coaxially with said burner toward and away from the latter to respectively engage the moil of a glass article at said treating position and to exert a pull on the engaged moil for severing the latter from the body portion upon softening of the glass article by said flame corona at said plane of severance,
means for urging said clutch means away from said burner following engagement thereof with the moil of a glass article,
control means registering the time elapsing between the movement of a glass article to said treating position by said support means and the movement of said clutch means away from the burner in response to the severance of the moil from the body portion, and
means rendered operative in response to said movement of the clutch means away from the burner and being actuated by said control means to move said support means away from said burner at an interval after said movement of the clutch means away from the burner which is a function of said time registered by the control means, thereby to terminate the finishing of the edge of the body portion by said flame corona with the period of finishing of the edge varying in accordance with variations in the period required for severing of the moil from the body portion.

2. An apparatus as in claim 1; further comprising means for decreasing the ratio of said finishing period to said severing period in accordance with increases in the latter.

3. An apparatus as in claim 1; wherein said control means includes means defining a space for receiving a liquid, means for introducing liquid into said space at a first controlled rate during said time so that the quantity of liquid in said space at the end of said time corresponds to the length of the latter, means for discharging said quantity of liquid from said space at a second controlled rate so that said quantity is removed from said space at the end of said interval, and means responsive to the removal of said quantity of liquid from said space to cause operation of said means for moving the support means away from the burner.

4. An aparatus as in claim 3; further comprising means automatically adjusting said second controlled rate in accordance with the magnitude of said quantity of liquid so that the ratio of said interval to said time is decreased in response to increases in said time.

5. An apparatus as in claim 1; wherein said control means includes a cylinder having a piston movable therein, first and second tanks connected with the opposite ends of said cylinder with first and second adjustable flow metering valves respectively interposed therebetween to regulate the rates of flow of a liquid from said cylinder, at the opposite sides of said piston, in the directions toward the related tanks, means causing flow of liquid from said first tank into said cylinder and from the latter into said second tank during said time so that the quantity of liquid in said second tank at the end of said time is a function of the latter and further causing return flow of said quantity of liquid from said second tank into said cylinder during said interval so that the ratio of said time to said interval is determined by said first and second metering valves, respectively, with said piston being displaced in one direction and returned in the opposite direction during said time and said interval, respectively, and means actuated upon said return of the piston in the opposite direction to cause operation of said means for moving the support means away from the burner.

6. An apparatus as in claim 5; wherein said means causing the flow of liquid between said tanks and cylinder includes distributor valve means having a first position in which said first and second tanks are respectively pressurized and vented and a second position in which said first and second tanks are respectively vented and pressurized, means moving said distributor valve to its first position upon movement of a glass article to said treating position by said support means, and means moving said distributor valve to its second position upon movement of the clutch means away from the burner following severing of the moil from the body portion of the article.

7. An apparatus as in claim 5; further comprising means connected with said piston and operative to adjust said second metering valve in accordance with the length of stroke of said piston, thereby to vary the ratio of said interval to said time in response to changes in the latter.

8. A method of burning-off a moil portion from the body portion of a glass article, comprising
vertically positioning the glass article coaxially in a flame corona, with the desired plane of severance between said body portion and said moil portion at the level of said flame corona,
rotating the glass article relative to the flame corona so that the article is uniformly subjected to heating by said flame corona at said plane of severance,
applying a substantially constant tensile force on one of said moil and body portions during the heating of the glass at the plane of severance,
registering the softening time from the beginning of the heating of the glass until severance of the two portions occurs,
removing said moil portion from said body portion, maintaining the edge of the body portion in the region of influence of the flame corona for finishing the edge of the body portion during a period of time which depends on the registered softening time,
and removing the finished article from the flame corona at the conclusion of said period.

9. The method as in claim 8; wherein, during registration of the softening time, the dependency of said finishing period on the softening time is adjusted continuously so as to reduce the ratio of said finishing period to said softening time in response to increases in the latter.

References Cited by the Examiner
UNITED STATES PATENTS

| | | | |
|---|---|---|---|
| 1,577,538 | 3/26 | Parker | 65—269 |
| 2,158,108 | 5/39 | De Glon | 137—624.18 |
| 2,304,131 | 12/42 | Vickers | 121—58 |
| 2,782,798 | 2/57 | Ericson | 137—625.18 X |
| 3,012,541 | 12/61 | Meulendyk | 121—38 |

DONALL H. SYLVESTER, *Primary Examiner.*